UNITED STATES PATENT OFFICE.

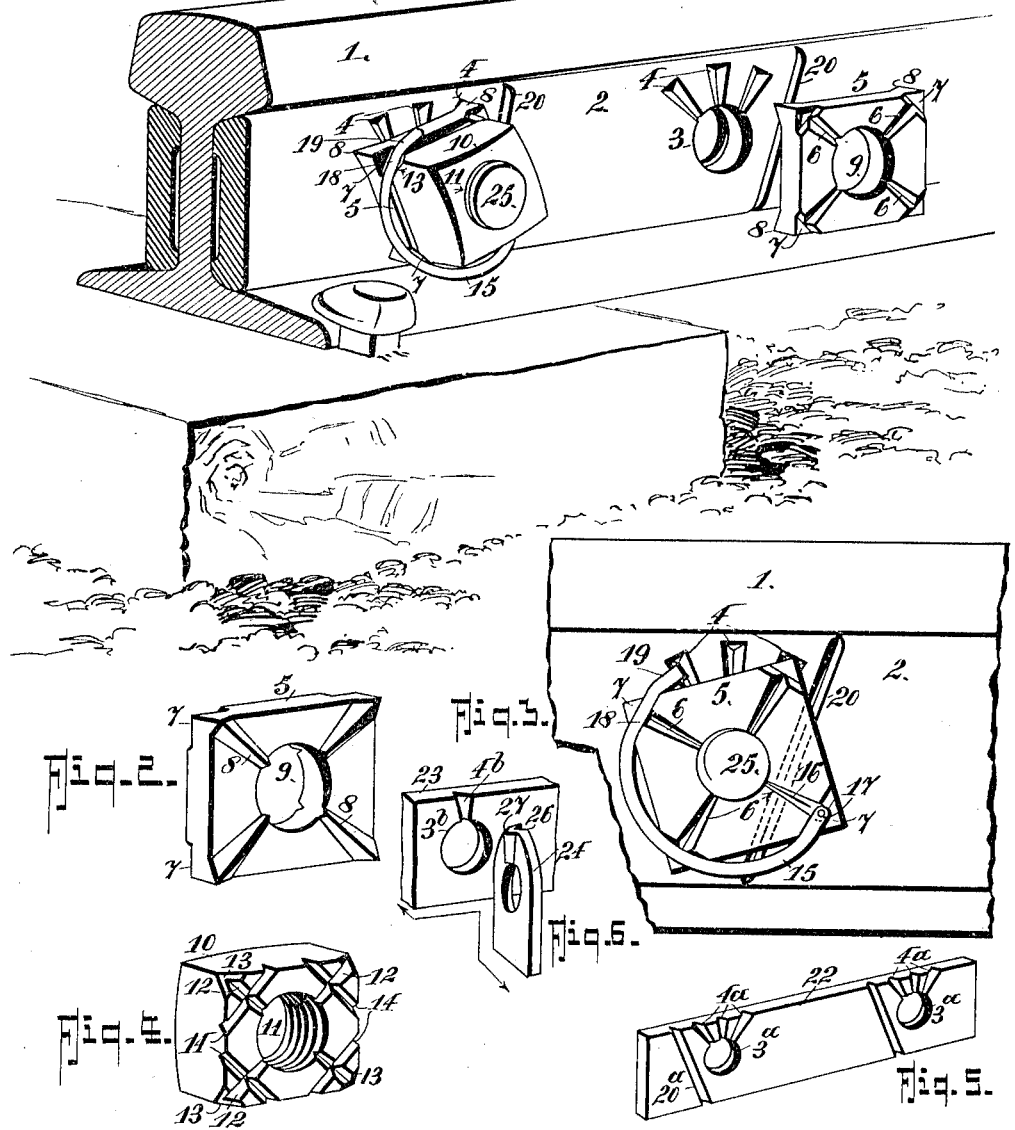

EDMUND HOLTON WESTBROOK, OF LIBERTY, MISSISSIPPI.

NUT-LOCK.

1,066,870.

Specification of Letters Patent.

Patented July 8, 1913.

Application filed May 29, 1912. Serial No. 700,358.

*To all whom it may concern:*

Be it known that I, EDMUND H. WESTBROOK, residing at Liberty, in the county of Amite and State of Mississippi, have invented certain new and useful Improvements in Nut-Locks, of which the following is a specification.

My invention relates to certain new and useful improvements in nut locks designed particularly for use on railway rails and the like, although the same is also adapted for use wherever nuts are to be locked on their bolts.

The invention resides in those novel features of construction, combination and arrangement of parts, all of which will be first fully described and then be specifically pointed out in the appended claims, reference being had to the accompanying drawing, in which:—

Figure 1 designates a perspective view showing the invention in use, one bolt, washer and nut being shown assembled and "locked" while a second washer is shown separated from the fish plate to show the lock spring grooves on the washer and the grooves in the fish plate. Fig. 2 is a detail perspective view of the washer taken from the fish plate engaging side. Fig. 3 is an elevation of the parts constituting the invention with the exception of the nut which has been removed to show the location of the lock spring with relation to the washer. Fig. 4 is a perspective view of the nut taken from the washer engaging side. Fig. 5 is a perspective view of an auxiliary lock plate for use in connection with fish plates where the fish plates are not provided with the washer engaging grooves. Fig. 6 is a detail perspective view of a modified form of washer and lock plate.

In the accompanying drawings, in which like numerals and letters of reference indicate like parts in all the figures, 1 is the rail, and 2 designates the fish plates. The fish plate 2 has the bolt holes 3 that aline with the rail holes, and it is also provided with one or more radial grooves or notches 4, radiated from the bolt hole.

5 is the lock washer which constitutes a part of my invention. The washer 5, on the nut engaging side, has a set of radial grooves 6 which merge with peripheral notches 7 to coöperate with the lock spring 15 hereinafter again referred to. On the fish plate engaging face (see Fig. 2), the washer 5 is provided with a series of radial projections 8, which are adapted to engage the recesses 4 in the fish plate, to hold the washer from turning. The washer 5 has a bolt hole 9.

10 designates the nut which forms another part of my invention, and the nut 10 on its washer engaging face, is provided with a series of radial grooves 12 that merge with peripheral recesses 13, the grooves 12 and recesses 13 coöperating with the grooves 6 and recesses 7 of the washer, and with the lock spring 15 in a manner later better understood.

11 is the bolt hole of the nut 10, which nut is threaded to fit on the bolt 25 in the usual way.

In assembling the device, the washer 5 is placed on the bolt and adjusted to bring one of the projections 8 into one of the grooves 4, and the nut 10 is then screwed on to the bolt. After the nut has been screwed home, the lock spring 15 is adjusted in position. The spring 15, it will be observed, is a bow spring, to one end of which, at 17, is hinged a spike like member 16 which is inserted into the grooves 6 and 12, between the washer 5 and the nut 10. The bow spring 15 is then sprung over the side faces or flats of the nut to rest in the notches 13 thereof, and in the notches 7 of the washer 5. If desired, the spring 15 may be bent flatwise, as at 18, and have its end 19 bent over to assist in preventing its accidental displacement.

In order to tighten up on the nut and washer, the spring 15 may be thrown back and if necessary, removed so that the nut may be tightened further, after which the lock spring and spike or wedge member 16 may be readjusted in position.

It will be observed that in my construction, the member 16 forms a key to lock the nut and washer together by insertion of the key 16 into the grooves 6 and 12. While the spring 15 serves as a means for preventing the key 16 from dropping out as well as serving as a means for assisting in locking the nut and washer from turning with relation to one another by seating in the recesses 7 and 13, and should the fish plate of the rail not be provided with the notches or grooves 4, an auxiliary plate 22 may (see Fig. 5) be fitted over the fish plate 2, and the plate 22 is provided with notches and recesses 4ª radiating from the bolt holes 3ª.

20 and 20ª designate key grooves in the fish plate 2 and the auxiliary plate 22 respectively in which wedging keys may be driven.

In Fig. 6 is shown a modification of the invention in which the plate 23 which may be either the fish plate or an auxiliary plate, has the bolt hole 3ᵇ and a notch 4ᵇ to coöperate with the washer 24, which in this form is stamped to form a projection 27 on one side and a recess 26 on the other side. The lower edge of the washer 24 is straight to rest on the rail base and thus assist in preventing the turning of the washer, particularly when the washer 24 is used with a fish plate that does not have grooves 4ᵃ or 4ᵇ. The nut 10 when used with the washer 24 is screwed home on the bolt and the member 16 of the spring may be inserted in a groove 12 that is brought in alinement with the recess or groove 26 and the spring 15 is then sprung around the nut 10 in the same manner as indicated in Fig. 1.

From the foregoing description, taken in connection with the accompanying drawings, it is thought the complete construction, operation and advantages of the invention will be apparent to those skilled in the art.

What I claim is:—

1. The combination with the bolt, and the nut having radial grooves, of a lock washer, means holding said washer from turning, said washer having a groove, a spring lock device including a bow portion and an inwardly projecting holding end hinged to said bow portion, said hinged end adapted to lie in said washer groove, and said bow portion adapted to embrace the nut on its side faces, thereby holding said nut from turning.

2. The combination with the bolt, and the nut having radial grooves, of a lock washer, means holding said washer from turning, said washer having a groove, a spring lock device including a bow portion, and an inwardly projecting holding end hinged to said bow portion, said hinged end adapted to lie in said washer groove, and said bow portion adapted to embrace the nut on its side faces, thereby holding said nut from turning, said nut having peripheral recesses to receive said bow portion.

3. The combination with the bolt, and the nut having radial grooves, of a lock washer, means holding said washer from turning, said washer having a groove, a spring lock device including a bow portion, and an inwardly projecting spike like holding end carried by said bow portion, said end adapted to lie in said washer groove, and said bow portion adapted to embrace the nut on its side faces, thereby holding said nut from turning, said washer having peripheral recesses to receive said bow portion, said bow portion having straight sections to lie in said peripheral recesses.

4. The combination with the bolt, of a nut having radial grooves and its corners adjacent to said grooves beveled to form corner recesses, said radial grooves diverging from the bolt opening of the nut toward the corners, of a spring lock device including a spike like end to lie in one of said radial grooves, and a bow portion to peripherally embrace said nut and lie in said corner recesses, said bow portion including straight sections for engaging said corner recesses, the free end of said bow portions being bent over at an angle to the adjacent straight portion substantially as specified.

5. The combination with the bolt, of a nut having radial grooves and its corners adjacent to said grooves beveled to form corner recesses, said radial grooves diverging from the bolt opening of the nut toward the corners, of a spring lock device including a spike like end to lie in one of said radial grooves, and a bow portion to peripherally embrace said nut and lie in said corner recesses, said bow portion including straight sections for engaging said corner recesses, the free end of said bow portions being bent over at an angle to the adjacent straight portion, together with a lock washer having corresponding radial grooves to receive said spike like member, and having corresponding peripheral or corner recesses to receive said bow portion, and means for holding said washer from turning.

EDMUND HOLTON WESTBROOK.

Witnesses:
C. T. GORDON,
H. P. MOSELEY.

---

Copies of this patent may be obtained for five cents each, by addressing the "Commissioner of Patents, Washington, D. C."